United States Patent
Bacon et al.

(10) Patent No.: US 7,212,816 B2
(45) Date of Patent: *May 1, 2007

(54) FIXED WIRELESS TELEPHONE DEVICE

(75) Inventors: James Bacon, Norcross, GA (US); Elizabeth A. Mark, Atlanta, GA (US)

(73) Assignee: BellSouth Intellectual Property Management, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/353,860

(22) Filed: Feb. 13, 2006

(65) Prior Publication Data

US 2006/0211403 A1 Sep. 21, 2006

Related U.S. Application Data

(63) Continuation of application No. 10/321,071, filed on Dec. 16, 2002, now Pat. No. 6,999,761.

(60) Provisional application No. 60/405,954, filed on Aug. 26, 2002.

(51) Int. Cl.
*H04Q 7/20* (2006.01)

(52) U.S. Cl. .............. 455/426.2; 455/554.1; 455/554.2; 455/555

(58) Field of Classification Search ........ 455/74.1, 455/426.2, 426.1, 554.1, 554.2, 406, 414.1, 455/421, 422.1, 456.1, 555, 565, 552.1, 553.1, 455/461

See application file for complete search history.

(56) References Cited

U.S. PATENT DOCUMENTS

| | | | |
|---|---|---|---|
| 4,922,517 A | 5/1990 | West, Jr. et al. | 379/58 |
| 5,361,297 A | 11/1994 | Ortiz et al. | 379/130 |
| 5,365,573 A | 11/1994 | Sakamoto et al. | 379/61 |
| D354,749 S | 1/1995 | Phillips | D14/151 |
| D362,003 S | 9/1995 | Claudio | D14/240 |
| 5,469,494 A | 11/1995 | Ortiz Perez et al. | 375/27 |
| 5,530,945 A | 6/1996 | Chavez, Jr. et al. | 379/62 |
| 5,535,274 A | 7/1996 | Braitberg et al. | 379/446 |
| 5,590,406 A | 12/1996 | Bayley et al. | 455/54.2 |
| 5,715,296 A | 2/1998 | Schornack et al. | 379/58 |
| 5,732,074 A | 3/1998 | Spaur et al. | 370/313 |
| 5,745,850 A | 4/1998 | Aldermeshian et al. | 455/417 |
| 5,799,254 A * | 8/1998 | Karmi et al. | 455/528 |
| 5,812,637 A | 9/1998 | Schornack et al. | 379/59 |

(Continued)

OTHER PUBLICATIONS

"Andrew Corporations Extensis™ Unit Extends Wireless Options for Mobile Professionals," Press Release, Mar. 20, 2001, Andrew Corporation, 2002. http://www.andrew.com/pressroom/pressreleases/english/01/20010320extensis.aspx.

(Continued)

*Primary Examiner*—Jean Gelin
(74) *Attorney, Agent, or Firm*—Merchant & Gould

(57) ABSTRACT

Methods and apparatus are disclosed for establishing a fixed wireless telephone service. A fixed wireless device includes a wireless device for establishing wireless connections to a wireless communications network that interfaces with a public switched telephone network. The fixed wireless device includes a connection that provides telephone service for an ordinary POTS-based telephone, handset, computer, or other communication device. Various techniques are provided for monitoring during use and/or verifying prior to use whether the fixed wireless device remains in an intended fixed location.

17 Claims, 8 Drawing Sheets

U.S. PATENT DOCUMENTS

| | | | | |
|---|---|---|---|---|
| 5,818,915 | A | 10/1998 | Hayes, Jr. et al. | 379/114 |
| 5,832,371 | A | 11/1998 | Thornton | 455/90 |
| 5,859,894 | A | 1/1999 | Ortiz Perez et al. | 379/27 |
| 5,864,763 | A | 1/1999 | Leung et al. | 455/557 |
| 5,894,596 | A | 4/1999 | Hayes, Jr. | 455/418 |
| 5,911,123 | A * | 6/1999 | Shaffer et al. | 455/554.1 |
| 5,913,176 | A | 6/1999 | Barabash | 455/560 |
| 5,946,616 | A | 8/1999 | Schornack et al. | 455/422 |
| 5,966,428 | A | 10/1999 | Ortiz Perez et al. | 379/27 |
| 6,002,937 | A | 12/1999 | Young et al. | 455/462 |
| 6,014,560 | A | 1/2000 | Kramer | 455/414 |
| 6,018,665 | A | 1/2000 | Chavez, Jr. et al. | 455/462 |
| 6,032,034 | A | 2/2000 | Rabina et al. | 455/401 |
| 6,035,220 | A | 3/2000 | Claudio et al. | 455/564 |
| 6,073,010 | A | 6/2000 | Dufour | 455/422 |
| 6,122,514 | A | 9/2000 | Spaur et al. | 455/448 |
| 6,134,437 | A | 10/2000 | Karabinis et al. | 455/427 |
| 6,151,500 | A * | 11/2000 | Cardina et al. | 455/435.2 |
| 6,195,531 | B1 * | 2/2001 | Aguirre et al. | 455/11.1 |
| 6,240,277 | B1 | 5/2001 | Bright | 455/74.1 |
| 6,256,488 | B1 * | 7/2001 | Lee et al. | 455/401 |
| 6,304,565 | B1 | 10/2001 | Ramamurthy | 370/352 |
| 6,324,410 | B1 | 11/2001 | Giacopelli et al. | 455/554 |
| 6,332,073 | B1 | 12/2001 | Nilsson et al. | 455/404 |
| 6,341,218 | B1 | 1/2002 | Poplawsky et al. | 455/90 |
| 6,377,825 | B1 | 4/2002 | Kennedy et al. | 455/569 |
| 6,405,027 | B1 | 6/2002 | Bell | 455/403 |
| 6,418,129 | B1 | 7/2002 | Fingerhut | 370/328 |
| 6,430,164 | B1 | 8/2002 | Jones et al. | 370/313 |
| 6,466,799 | B1 | 10/2002 | Torrey et al. | 455/462 |
| 6,498,938 | B1 | 12/2002 | Morrow, Sr. | |
| 6,516,192 | B1 | 2/2003 | Spaur et al. | 455/422 |
| 6,529,707 | B1 | 3/2003 | Dent | 455/13.1 |
| 6,535,743 | B1 | 3/2003 | Kennedy, III et al. | 455/553 |
| 6,600,925 | B1 | 7/2003 | Rams | 455/445 |
| 6,615,056 | B1 | 9/2003 | Taylor et al. | 455/554 |
| 6,625,034 | B2 | 9/2003 | Davis et al. | 361/759 |
| 6,631,275 | B1 * | 10/2003 | Martin et al. | 455/560 |
| 6,633,628 | B1 | 10/2003 | Linder et al. | 379/22.07 |
| 6,650,871 | B1 | 11/2003 | Cannon et al. | 455/41.2 |
| 6,704,580 | B1 | 3/2004 | Fintel | |
| 6,775,552 | B2 * | 8/2004 | Link, II | 455/456.1 |
| 6,901,260 | B1 * | 5/2005 | Xin | 455/456.1 |
| 6,901,271 | B1 * | 5/2005 | Cheah et al. | 455/564 |
| 7,035,633 | B2 | 4/2006 | Kirkpatrick | 455/426.1 |
| 2001/0018326 | A1 | 8/2001 | Link, II | 455/3.05 |
| 2001/0029186 | A1 | 10/2001 | Canyon et al. | 455/462 |
| 2001/0041533 | A1 | 11/2001 | Schornack et al. | 455/3.05 |
| 2002/0068529 | A1 | 6/2002 | Knoble | 455/74.1 |
| 2002/0072390 | A1 | 6/2002 | Uchiyama | 455/557 |
| 2002/0098850 | A1 * | 7/2002 | Akhteruzzaman et al. | 455/456 |
| 2002/0106994 | A1 | 8/2002 | Payne et al. | 455/74.1 |
| 2002/0115455 | A1 | 8/2002 | Umstetter et al. | 455/462 |
| 2002/0146977 | A1 | 10/2002 | Schornack et al. | 455/3.05 |
| 2003/0017843 | A1 | 1/2003 | Noblins | 455/553 |

OTHER PUBLICATIONS

"If You Have A Cell Phone, You Need A CellSocket . . . ," 2001, 2002 WHP Wireless, Inc., http://www.cellsocket.com/welcome.html, no month listed.

U.S. Appl. No. 10/324,543, entitled "Methods and Apparatus for Establishing A Fixed Wireless Telephone Service," filed Dec. 19, 2002, Inventor: James Bacon; Roberto Peon; Stephen Sherman.

U.S. Appl. No. 10/319,937, entitled "Call Handling For A Fixed Wireless Device," filed Dec. 16, 2002, Inventor: James Bacon.

U.S. Patent Application filed Dec. 30, 1999, entitled Method and Apparatus for Fixing the Location of a Fixed Wireless Terminal In A Wireless Network, Inventor: Charles M. Link, II.

U.S. Appl. No. 09/742,764 (Continuation-In-Part), entitled "Method and Apparatus for Fixing the Location of a Fixed Wireless Terminal In A Wireless Network," filed Dec. 20, 2002, Inventor: Charles M. Link, II.

U.S. Appl. No. 10/044,100, entitled "Wireless Telephone Base Unit With Multiple Cordless Handset Capability," filed Oct. 19, 2001, Inventor: Mark A. Kirkpatrick.

U.S. Appl. No. 10/044,585, entitled, "Apparatus for Providing A Gateway Between A Wired Telephone and A Wireless Telephone Network," filed Oct. 23, 2001, Inventor: Mark A. Kirkpatrick.

U.S. Appl. No. 10/195,197, entitled, System and Method for Interfacing Plain Old Telephone System (POTS) Devices with Cellular Networks, filed Jul. 15, 2002, Inventors: Steven Neil Tischer; Kevin Paul Kleinfelter.

U.S. Appl. No. 10/639,553, filed Aug. 12, 2003, entitled "Fixed Wireless Telephone Device", Inventor: Link.

U.S. Official Action dated Nov. 24, 2003 in U.S. Appl. No. 10/324,543.

U.S. Official Action dated Dec. 17, 2003 in U.S. Appl. No. 10/319,937.

U.S. Official Action dated Jun. 21, 2004 in U.S. Appl. No. 10/319,937.

U.S. Official Action dated Sep. 2, 2004 in U.S. Appl. No. 10/044,100.

U.S. Final Official Action dated Apr. 19, 2005 in U.S. Appl. No. 10/044,585.

U.S. Final Official Action dated Jul. 15, 2005 in U.S. Appl. No. 10/319,937.

U.S. Official Action dated Jul. 29, 2003 in U.S. Appl. No. 10/044,585.

U.S. Final Official Action dated Feb. 23, 2004 in U.S. Appl. No. 10/044,585.

U.S. Official Action dated Sep. 3, 2004 in U.S. Appl. No. 10/044,585.

U.S. Final Official Action dated Dec. 15, 2004 in U.S. Appl. No. 10/319,937.

* cited by examiner

FIXED WIRELESS TELEPHONE DEVICE

RELATED APPLICATIONS

This application is a continuation application of Ser. No. 10/321,071, filed on Dec. 16, 2002 now U.S. Pat. No. 6,999,761 entitled "Fixed Wireless Telephone Device", which claims priority to U.S. Provisional Application 60/405,954, filed on Aug. 26, 2002, entitled "Methods and Apparatus for Establishing a Fixed Wireless Telephone Service." This application is related to U.S. application Ser. No. 10/044,585, filed on Oct. 23, 2001, entitled "Apparatus for Providing A Gateway Between A Wired Telephone and A Wireless Telephone Network", now issued as U.S. Pat. No. 7,035,633 issue date Apr. 25, 2006. The technical disclosures of all the aforementioned applications are hereby incorporated herein by reference.

TECHNICAL FIELD

The present invention is related to providing access to telephone services. More particularly, the present invention is related to establishing a fixed wireless telephone jack through which the telephone services may be provided.

BACKGROUND

Providing telephone services to fixed locations conventionally involves installing landlines to the locations where telephone services are needed. Installation of landlines may take months in many areas of the world, such as in developing countries and in remote areas of developed countries. In addition to requiring a relatively lengthy amount of time, landline installation is expensive for the service provider as well as the customer in need of telephone service. Therefore, providing telephone services through landline installations is not necessarily a feasible option.

Providing telephone services through mobile phone cellular networks does not require that a landline be installed to the location where telephone services are needed, but wireless mobile phones themselves are expensive. Additionally, usage charges for wireless phones are typically much higher than those for a conventional landline telephone due to telecommunications regulatory provisions applicable to mobile phones and due to the limited availability of radio-frequency bandwidth. Furthermore, the portable nature of wireless phones may periodically result in lower communication quality than landline telephone service. For example, mobile phones are susceptible to dropped calls or noise while moving from place to place, and additionally the antenna of the wireless phone may be inadequate within buildings or other structures due to signal attenuation. Thus, mobile phones are not necessarily a desirable option for providing telephone services.

SUMMARY

Embodiments of the present invention address these and other problems by providing a wireless device that is intended to be in a fixed location and that provides telephone service to a POTS telephone or other POTS device by communicating through a wireless telephone system. This allows a wireless telephone system to provide telephone service rather than running landlines to the end user to provide the telephone service.

One embodiment is a method of providing telephone service that involves providing a wireless device to provide telephone service to a POTS device by communicating through a wireless telephone system. It is detected whether an attempt to use the wireless device is occurring at a first location by analyzing switch records to determine base station information indicative of whether the wireless device is at the first location when in use.

Another embodiment is a method of providing telephone service that involves providing a wireless device to provide telephone service to a POTS device by communicating through a wireless telephone system. It is detected whether an attempt to use the wireless device is occurring at a first location by storing an indication of the first location in a memory and utilizing a geonavigational position system receiver to find an indication of the current location. The current location is compared to the first location.

Another embodiment is a wireless device for providing telephone service to a POTS device by communicating through a wireless telephone system. The wireless device includes a memory storing an indication of a first location and a geonavigational position system receiver for producing an indication of a current location. A comparator compares the indication of the first location to the indication of the current location to determine whether the wireless device is at the first location.

Another embodiment is a method of providing telephone service that involves providing a wireless device to provide telephone service to a POTS device by communicating through a wireless telephone system. It is detected whether an attempt to use the wireless device is occurring at a first location by transmitting a signal from the first location and attempting to receive the signal at the wireless device.

Another embodiment is a system for providing telephone service to a POTS device connected to a wireless device that communicates through a wireless telephone network. The system includes an emitter separate from the wireless device that produces a first signal and a receiver at the wireless device that is configured to receive the first signal when in proximity to the emitter. The receiver provides an indication of receiving the first signal to indicate that the wireless device is in proximity to the emitter.

Another embodiment is a wireless device for providing telephone service including data transmission. The wireless device includes a data transfer component for receiving digital data and producing a POTS signal that includes the digital data. A converter provides a wireless signal that includes the digital data in response to receiving the POTS signal. Wireless components transfer the wireless signal that includes the digital data through a wireless telephone system.

DETAILED DESCRIPTION

Embodiments of the present invention provide fixed wireless telephone service by utilizing a fixed wireless device that includes a jack for connection to an ordinary telephone. The ordinary telephone may then be used to answer incoming calls or to place an outgoing call. The incoming or outgoing calls are then established through the wireless connection achieved through the fixed wireless device. Under certain telecommunications regulations, while the fixed wireless device remains fixed the telephone service may be provided at rates less than those of typical wireless services. Certain embodiments may provide various techniques for verifying and/or ensuring that the fixed wireless device remains fixed during telephone calls.

Figure 1:
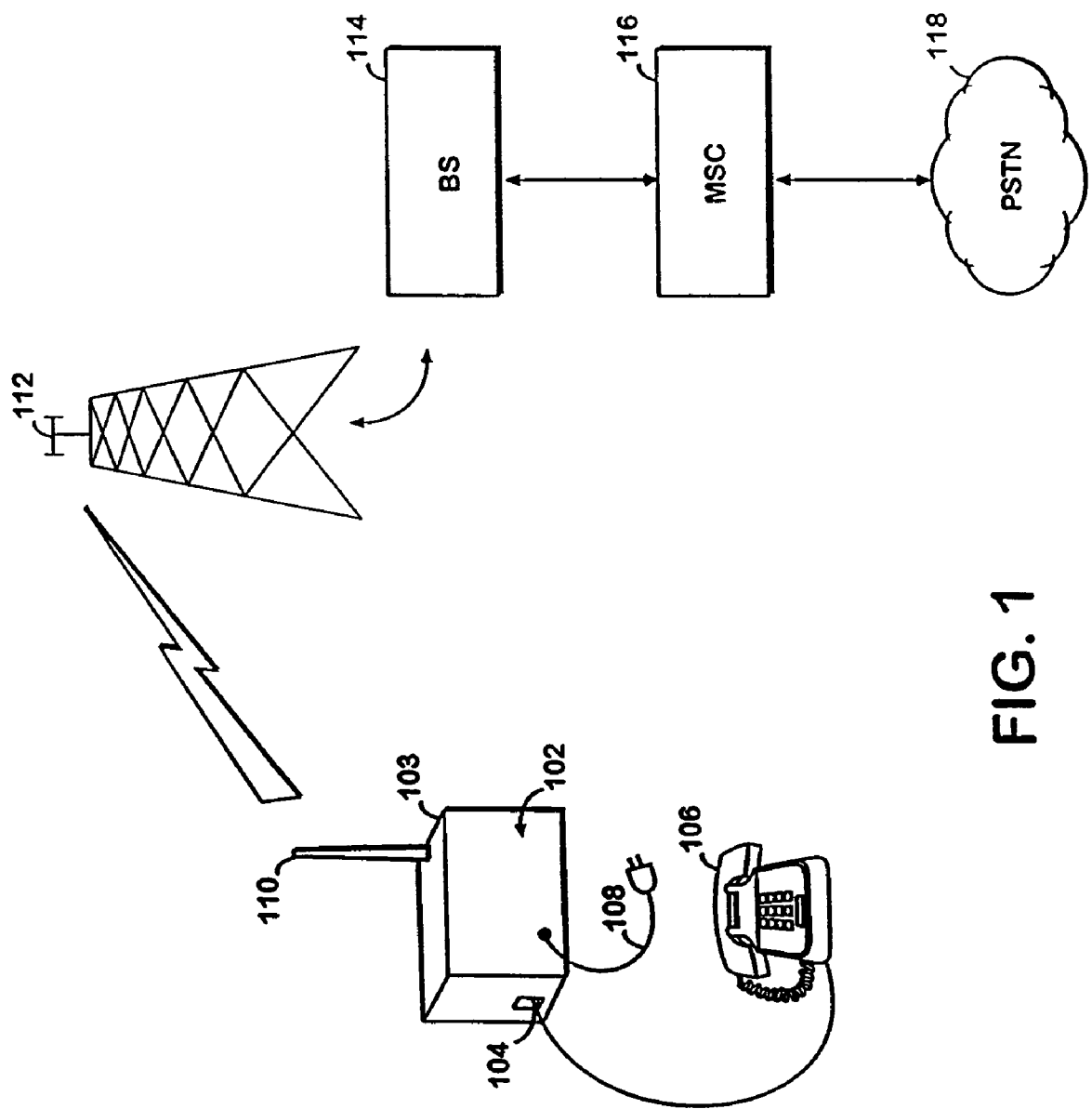
FIG. 1 shows an external view of one embodiment of the present invention that includes a fixed wireless device providing telephone service through an associated RJ-11 jack.

FIG. 1 shows one embodiment of a fixed wireless device 102 and the communication paths that establish telephone services. The fixed wireless device 102 provides a jack 104, such as an RJ-11 style jack, that allows an ordinary telephone or basic handset 106 to connect to the fixed wireless device 102. The ordinary telephone 106 may be a standard corded or cordless telephone typically used with landline telephone services. Additionally, the fixed wireless device 102 may be contained within a housing 103 that allows the fixed wireless device 102 to secure the internal components. The fixed wireless device 102 may be mounted in various ways such as on a tabletop or on a wall indoors and also outdoors if the housing 103 is properly sealed.

The fixed wireless device 102 is powered through one of various power sources. For example, the fixed wireless device 102 may utilize a wall adapter coupling 108 to receive power from a public utility. Alternatively, the fixed wireless device 102 may be powered by a battery, solar cell, or other source of electricity. The fixed wireless device 102 may include a visual indicator on the exterior of the housing 103 to indicate that the device 102 is receiving power and/or is operating correctly.

To establish wireless communications, the fixed wireless device 102 may include an additional antenna 110 or, as discussed below with reference to FIG. 2, may rely solely upon an antenna of a wireless phone included within the fixed wireless device 102. However, the additional antenna 110 may be an extended antenna that is placed outside a building that the fixed wireless device 102 is located within to increase the range and/or quality of the wireless connection. The fixed wireless device 102 communicates wireless radio frequency signals to a base station tower 112 or similar antenna structure that is in communication with a base station 114. This wireless communication may utilize various wireless protocols and/or multi-accessing techniques such as AMPS, time division multiple access ("TDMA"), code division multiple access ("CDMA"), as well as many others such as WCDMA, GSM, 1×RTT (with CDMA), Edge (with TDMA), GPRS (with GSM), CDMA 2000, 1×EVDO, and 1×EVDV The base station 114 controls wireless communication to wireless phones for a particular geographical area defined by the signal range of the tower 112. To complete the wireless communications, the base station 114 communicates with a mobile switching center 116 that may also be in communication with base stations of neighboring geographical areas. The communication between the base station 114 and the mobile switching station 116 may be through various techniques such as over telecommunication trunks or through a TCP/IP protocol network. The mobile switching center 116 establishes communication between the wireless phones for a base station 114 and the public switched telephone network 118 through conventional communications techniques. Thus, telephone services are provided between the ordinary telephone 206 and the public switched telephone network 118 through the wireless telephone network via the fixed wireless device 102.

Figure 2:
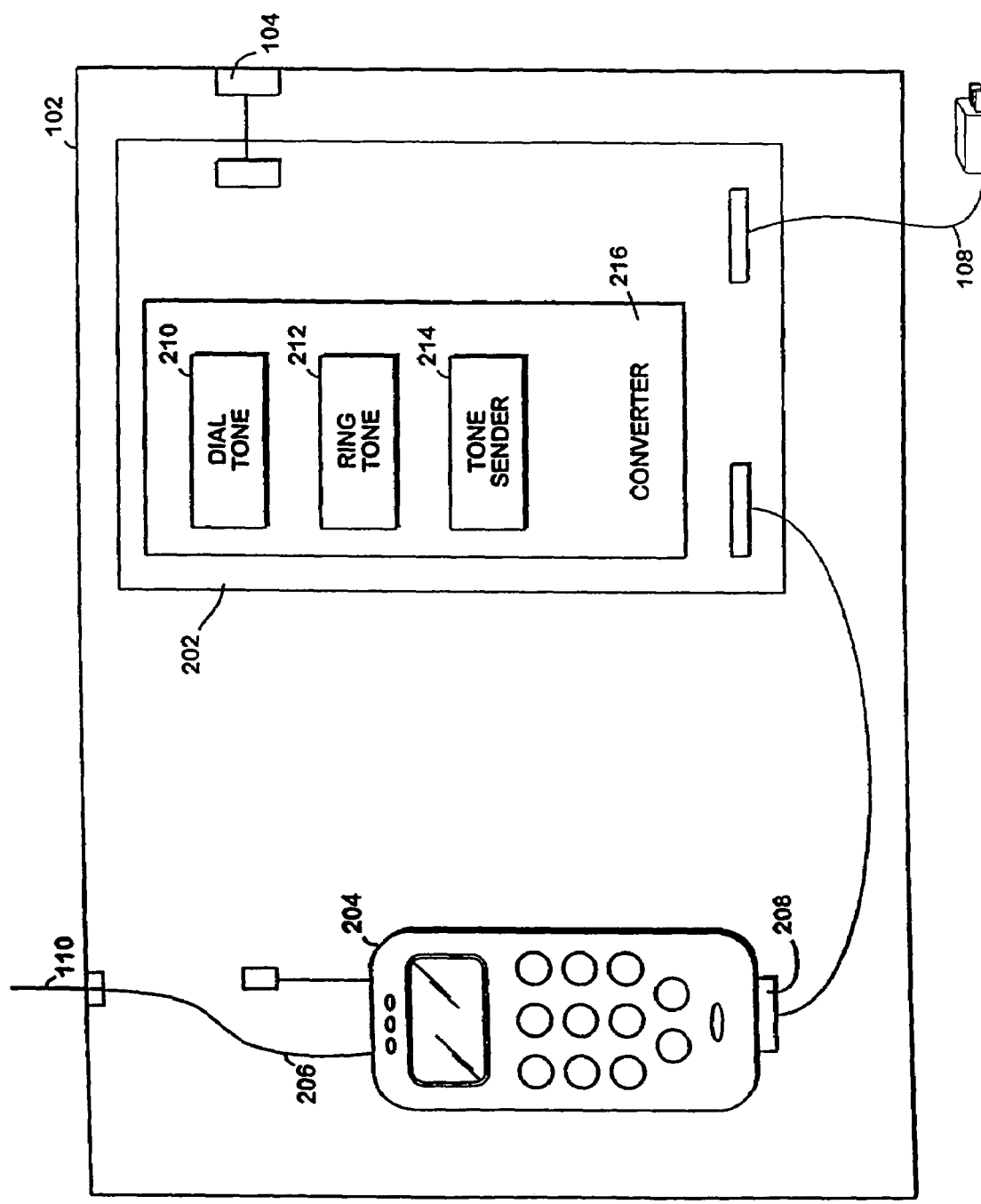
FIG. 2 shows the major internal components of one embodiment of the fixed wireless device.

The major components of one embodiment of the fixed wireless device 102 are shown in FIG. 2. In the example shown, the fixed wireless device 102 includes a mobile phone 204 to provide the wireless communications to the base station 114. It will be appreciated that rather than utilizing a whole mobile phone 204, a wireless transceiver chipset may be used instead. In either case, the phone 204 or stand-alone transceiver may be a refurbished or otherwise used piece of equipment that has been previously retired from service. Reusing the wireless equipment in this fashion reduces the costs associated with providing the fixed wireless device 102.

The wireless phone 204 or chipset is connected to additional components to establish telephone services through the fixed wireless device 102. An existing antenna of the phone 204 may be used to complete the air interface for the wireless communications, or the antenna 110 that is coupled to the phone 204 or chipset through coupling 206 may also be included to enhance the communication range of the fixed wireless device 102. Additionally, the phone 204 or transceiver chipset is linked through a coupling 208 to additional circuitry of printed circuit board ("PCB") 202. Additionally, power for the phone 204 or chipset may be received through the coupling 208 or by an existing battery of the phone 204. For example, the coupling 208 may be an adapter specific to a particular phone for connection to the auxiliary port of the phone 204.

The PCB 202 adapts the wireless phone 204 or chipset for use with a standard telephone 106 of FIG. 1. The PCB 202 includes various components represented generally as blocks. It will be appreciated that these block components may be provided in various forms including application specific integrated circuits, field programmable logic devices, or a general-purpose computer system executing application programs to perform the various operations. The components of the printed circuit board 202 generally provide the various aspects of ordinary telephone service through the RJ-11 jack 104 and the conversion of ordinary telephone and cellular telephone signals passing between the RJ-11 jack 104 and the coupling 208. The PCB 202 is powered through the wall adapter coupling 108 or other power source as discussed above.

The components of the PCB 202 act as a converter 216 to convert between the mobile cellular phone signaling and plain old telephone service ("POTS") signaling. The converter 216 includes any or all of the following devices. An encoder 210 may be included to provide a dial tone, busy tone, error, or off-hook timeout signal through the RJ-11 jack 104 to the ordinary telephone or basic handset 106 upon the user attempting to use the telephone 106. A ring tone generator 212 may be included to provide ring tone voltage through the RJ-11 jack 104 to the ordinary telephone 106 upon an incoming call being received through the fixed wireless device 102 to cause the ordinary telephone 106 to ring as is customary for an incoming call. Furthermore, a DTMF tone sender 214 may be included to produce data signals corresponding to analog tones produced by the ordinary telephone, such as tones resulting from the user pressing a key of the telephone 106 when dialing a number.

The converter 216, which also includes a processing device discussed below with reference to FIG. 7, interfaces the ordinary telephone 106 to the wireless phone 204 or chipset. The converter 216 converts wireless based signals from the coupling 208 to POTS signals that are delivered to the ordinary telephone 106, such as voice communication signals and/or a ring indicator for an incoming call. The converter 216 also works in the opposite direction to convert the POTS signals from the telephone 106 to cellular phone based signals for transfer by the wireless cellular phone 204 or chipset. A more detailed example of the converter circuitry of PCB 202 is discussed below with reference to FIG. 7.

For various reasons, it may be desirable to monitor and/or confirm prior to use that that fixed wireless device 102 remains in the intended fixed location. For example, certain telecommunications regulations may permit lower rates to be applied to non-mobile telephone services, so verifying that the fixed wireless device 102 remains fixed allows the usage of the telephone services to be charged at the lesser rate. Several techniques may be utilized for monitoring and/or confirming prior to use that the fixed wireless device 102 remains fixed.

As one example, the switch records that identify the particular base station 114 and cell faces of a base station 114 that the fixed wireless device 102 communicates with for a given call may be reviewed to determine whether the fixed wireless device 102 has been used at more than one location for a given telephone call of from one call to the next. Thus, when charges are determined for usage, the determination of whether the fixed wireless device 102 has been used outside of the intended fixed location may be used to charge certain usage at a mobile phone rate while other usage is charged at a lesser fixed location rate.

Figure 3:
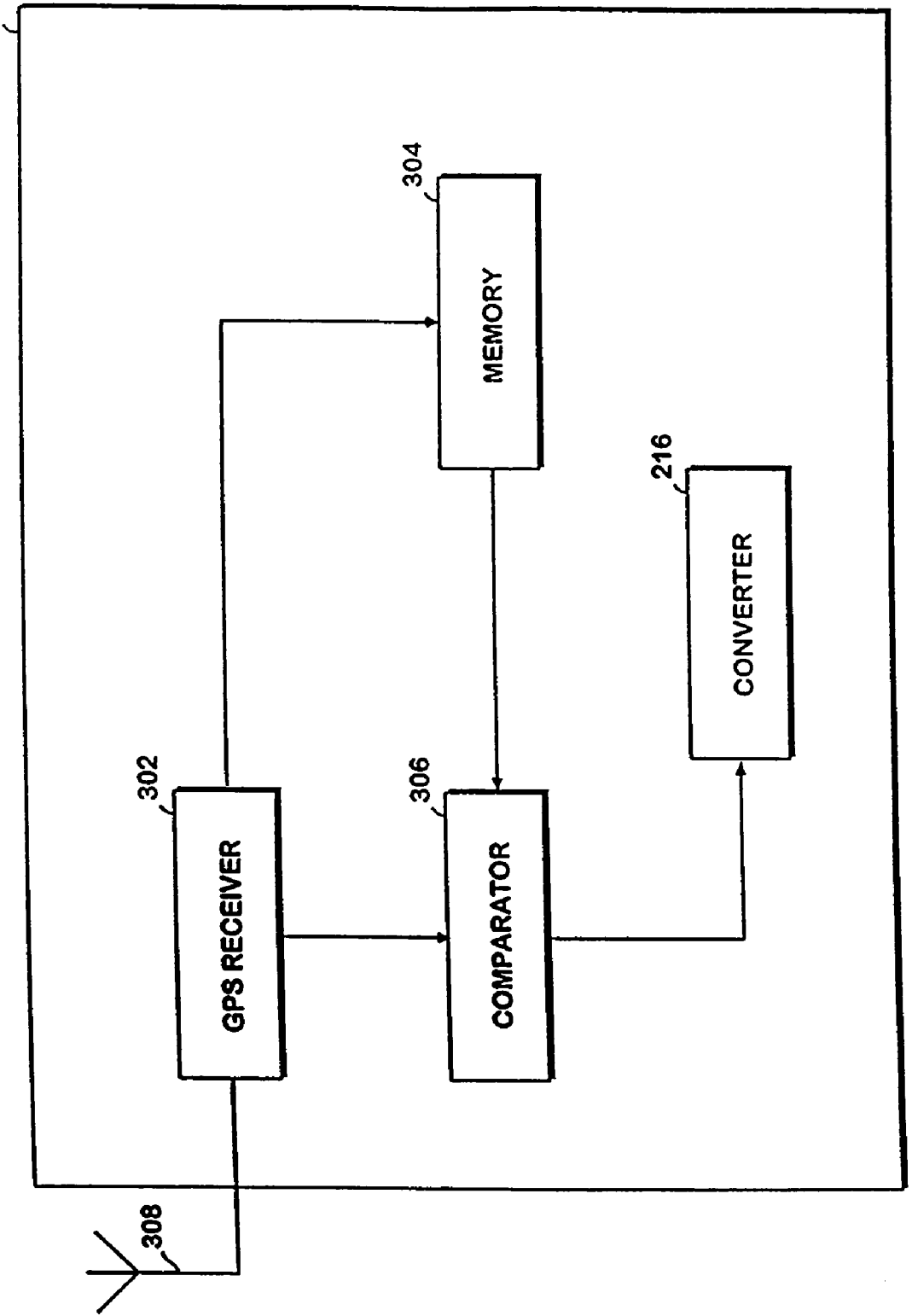
FIG. 3 shows additional components of one embodiment of a fixed wireless device that determines whether the fixed wireless device remains in a fixed location by utilizing geonavigational positioning.

FIG. 3 shows additional components of another embodiment of the fixed wireless device 102 that utilize GPS to determine whether the fixed wireless device 102 remains fixed. The circuit board 202 shown in FIG. 3 of the fixed wireless device 102 includes the converter 216. Additionally, the circuit board 202 includes a GPS receiver 302 linked to an antenna 308 that receives GPS signals from GPS satellites. Initially, the GPS receiver 302 may determine the location of the intended fixed location where the fixed wireless device 102 is currently located and provide the location data to a memory device 304 for later retrieval. Later, such as at the time a telephone call is attempted or during an established telephone call, the GPS receiver 302 determines its current location based on the received GPS signals and provides the location to a comparator 306.

The comparator 306 also receives the initial location previously stored in memory 304 and compares the current location to the previously stored location to determine whether the fixed wireless device 102 remains in the initial location. The comparator 306 then provides the result to the converter 216 where the telephone call can be terminated or prevented if the fixed wireless device 102 is not in the initial and intended location.

Figure 4:
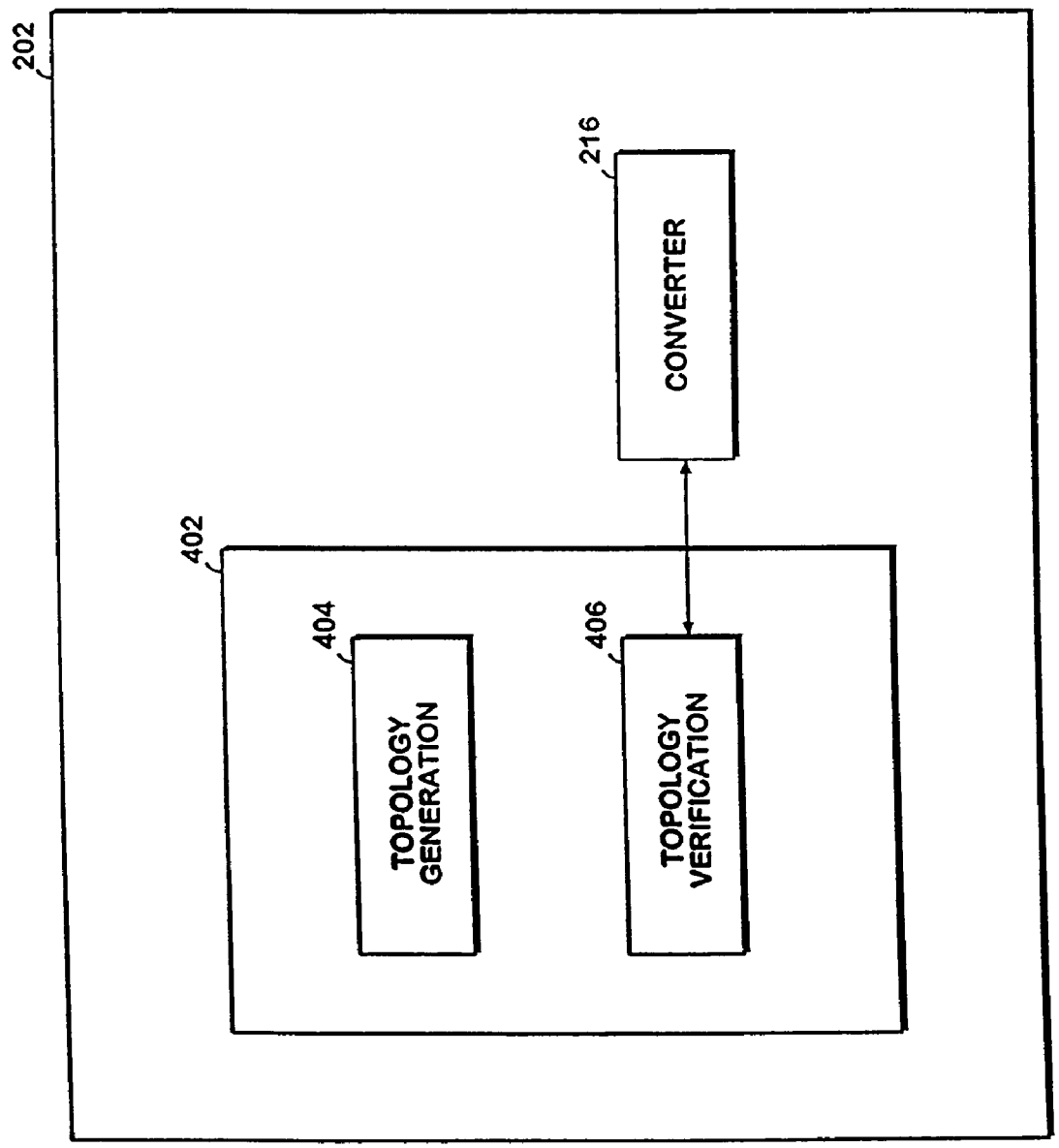
FIG. 4 shows additional components of another embodiment of a fixed wireless device that determines whether the fixed wireless device remains in a fixed location by using network models.

FIG. 4 illustrates another embodiment that includes additional components on the PCB 202 to determine whether the fixed wireless device 102 is in the intended fixed location through monitoring a network model. The PCB 202 includes a topology component 402 that includes a topology generation module 404 and a topology verification module 406. The topology component 402 and its modules and operations that determine whether the fixed wireless device 102 is fixed at the intended location are described more fully in commonly owned U.S. patent application Ser. No. 09/742,764, which is incorporated in its entirety herein by reference.

The topology component 402 corresponds to the controller 26 of U.S. patent application Ser. No. 09/742,764. The topology component 402 may communicate directly with the wireless phone 204 or chipset over the coupling 208 to determine network parameters such as signal ID codes and signal strength. The topology component 402 communicates with the converter 216 to indicate to the converter 216 whether the fixed wireless device 102 is in the intended fixed location or has moved so that the converter 216 can terminate or prevent a call if necessary.

Figure 5:
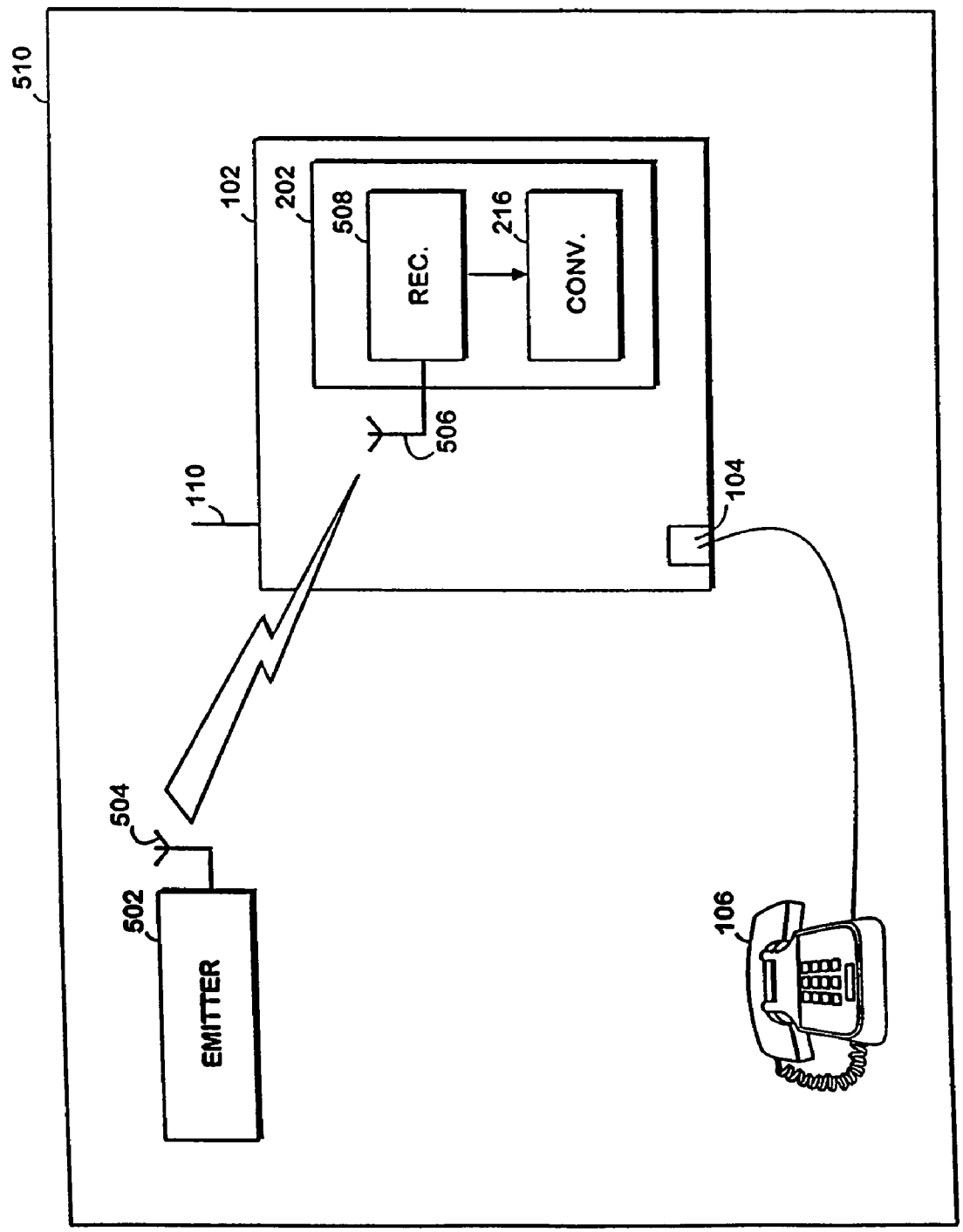
FIG. 5 shows additional components of another embodiment of a fixed wireless device that is fixed within a vehicle that determines whether the fixed wireless device remains within the vehicle.

FIG. 5 shows another embodiment of the fixed wireless device 102 that is fixed within a vehicle 510, such as a mass transit vehicle. In such a situation, it may be desirable for security or for usage charge purposes to monitor and/or verify prior to use whether the fixed wireless device 102 remains within the vehicle 510. To do so, additional components may be included on the PCB 202 of the fixed wireless device 102 including a receiver 508 coupled to an antenna 506. The receiver 508 receives short-range electromagnetic signals sent by an antenna 504 of an emitter device 502 that is also fixed within the vehicle 510.

The receiver 508 provides a signal to the converter 216 that indicates whether the signal from the emitter 502 has been received so that the converter 216 may terminate or prevent a call if necessary. For example, if the fixed wireless device 102 is removed from the vehicle 510, then the receiver 508 will be out of range of the emitter 504 that remains in the vehicle. The receiver 508 will then signal to the converter 216 that the signal is not received. The converter 216 will then prevent a call from occurring or terminate a call in progress until the fixed wireless device 102 returns to within range of the emitter 502.

A further enhancement to the system of FIG. 5 utilizes an emitter 502 that encodes a unique ID on the electromagnetic signal received by the receiver 508 and also includes a memory and comparator as shown in FIG. 3 that is coupled to the converter 216. The comparator receives the expected ID from memory and the received ID from the receiver 508 and then indicates to the converter 216 that the proper signal is received only if the received ID matches the ID stored in memory. This prevents the fixed wireless device 102 from operating when in range of another emitter device that does not provide the proper ID.

The emitter signal may be used as a one-time verification per call upon an attempt to send an outgoing call or receive an incoming call. Alternatively, the emitter signal maybe used as a keep alive signal so that a call can be made and can continue only while the keep alive signal is being received. The keep alive signal may be different for each vehicle 510 utilizing a fixed wireless network discussed with reference to FIG. 1 or may be a generic signal applicable to all such vehicles 510. Additionally, the telephone 106 that is coupled to the fixed wireless device 102 may also provide a signal encoded with an ID to the converter 216 so that the converter 216 can allow calls only when the ID of the emitter signal is correct as well as the ID from the phone 106.

The requirement of an emitter 502 and/or a phone 106 with a specific ID that is verified prior to allowing use of the fixed wireless device 102 may be applied to other situations in addition to the vehicle setting. For example, this two-piece or three-piece verification system may be applied in either a regular household or business setting to further guarantee that the fixed wireless device 102 is being used at the intended location and to further discourage theft and fraud.

Figure 6:
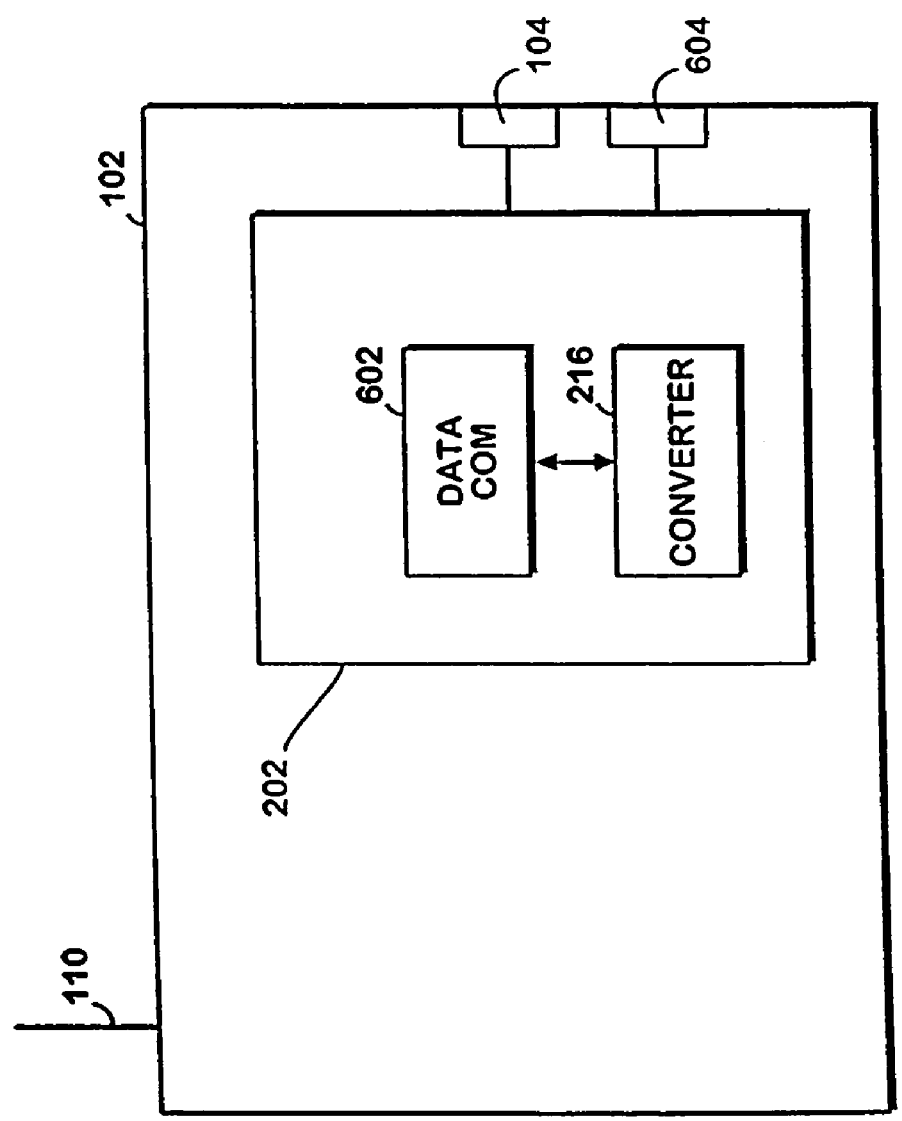
FIG. 6 shows additional components of another embodiment of a fixed wireless device that provides built-in data transfer capabilities.

FIG. 6 shows another embodiment of a fixed wireless device 102 where the PCB 202 includes a data capable wireless communication component 602 that may operate in conjunction with a wireless phone 204 or may establish a wireless communication path to a base station 114. For example, the data capable wireless communication component 602 may be a modem device for use in conjunction with an analog wireless phone to transfer data wirelessly. Alternatively, the data capable wireless communication component 602 may be a wireless modem capable of directly establishing the wireless connection to a base station 114 that data is transferred through. A separate data port 604 linked to the data communication component 602 may be provided for connection to a computer, PDA, or other device. The port 604 may be of various forms such as a serial port, USB, or IEEE 1394.

Although the device connected to the RJ-11 jack 104 is generally referred to as an ordinary telephone 106, it will be appreciated that other communication devices may utilize the telephone services provided through the jack 104. For example, a computing device, video display device, or other communication tool may be linked to the fixed wireless device 102 through a jack 104. Additionally, a payphone may be linked to the jack so that the fixed wireless telephone service is available only upon payment of a designated fee. This is particularly useful for the vehicle situation of FIG. 5 or fixed locations where a landline payphone is not available.

Figure 7:
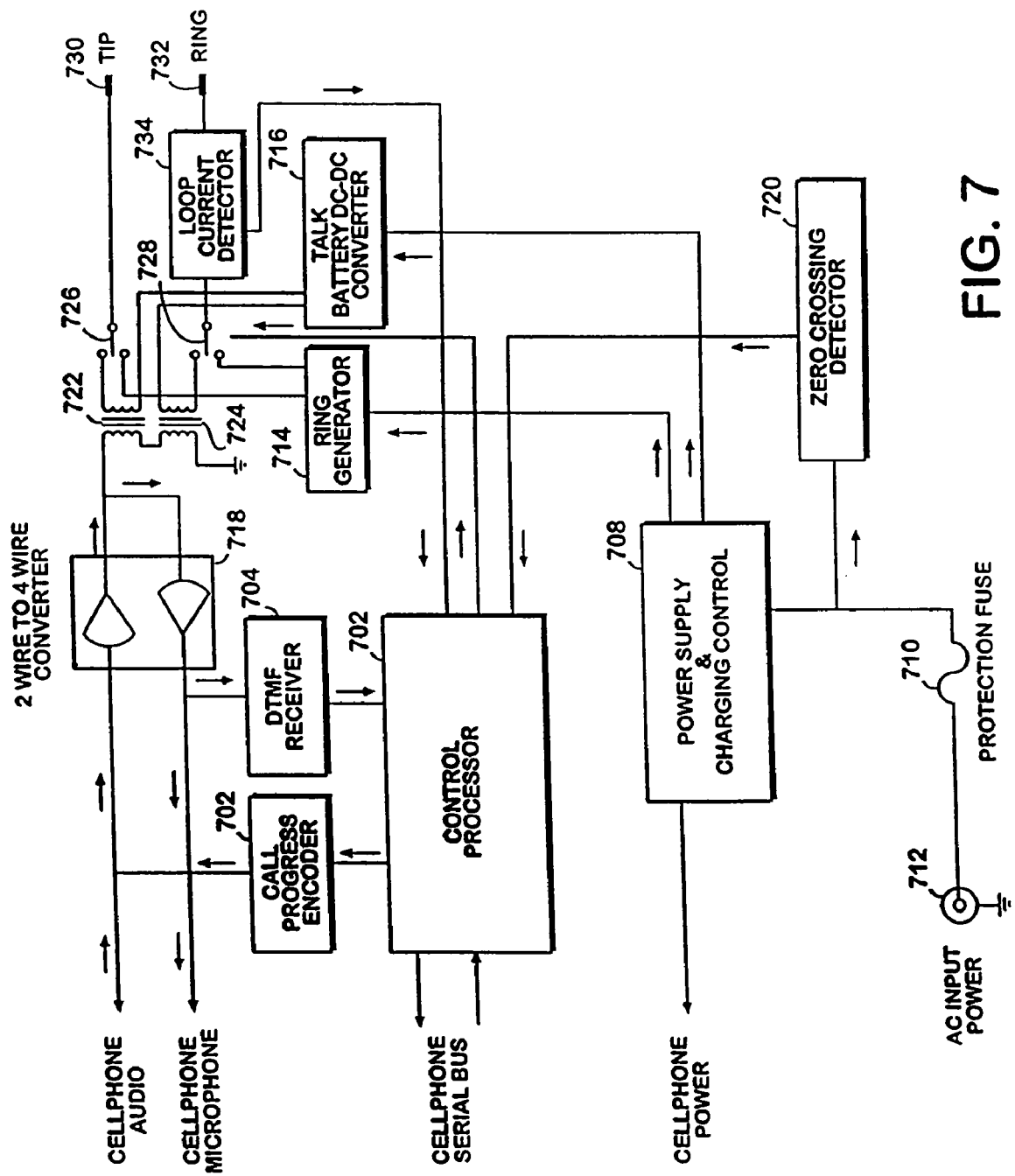
FIG. 7 shows one example of the converter circuitry that may be utilized by the various embodiments of FIGS. 2–7 to convert between plain old telephone service signaling and cellular mobile phone signaling.

FIG. 7 shows an example of the circuitry of converter 216 that is included on the circuit board 202 of the fixed wireless device 102 to establish the fixed wireless service. The circuitry includes a processor 702 that is linked to the serial bus of the cellular phone 204 through the phone adapter 208. The processor 702 is also linked to a DTMF receiver 704 and an encoder 706. Furthermore, the processor 702 may be linked to the various additional components of the embodiments shown in FIGS. 3–6 to monitor whether the fixed wireless device 102 is in its intended location during a call attempt.

The DTMF receiver 704 receives the tones resulting from the user dialing on the ordinary phone connected to the fixed wireless device 102. The DTMF receiver 704 translates the received analog tones to data signals that are provided to the processor 702 to indicate the activity of the user that produces the analog tone. The processor 702 then controls the cellular phone 204 accordingly through the interface to the serial bus to bring about the equivalent activity for the wireless connection. As discussed below with reference to FIG. 8, the processor 702 may queue the various dialed digits indicated by the data signals from the DTMF receiver 704 prior to outputting control signals to the cellular phone. The digits are queued until a specific key, such as the pound key, is pressed by the user. Then, all queued digits are sent to the cellular phone followed by a send command to simulate keypad input and thereby place a call or otherwise send queued tones during a call.

The encoder 706 receives data signals from the processor 702 that instruct the encoder 706 to produce analog signals that approximate those of a POTS system, such as the dial tone upon the user picking up the handset as well as other indicator tones including the busy tone and the off-hook time-out tone. These analog signals are transferred through the jack of the fixed wireless device 102 to the ordinary telephone where the corresponding tones are made audible for the user.

The processor 702 controls switches 726 and 728 to connect and disconnect a ring generator 714 from the ring connection 732 and tip connection 730 of the RJ-11 jack of the fixed wireless device 102. For an incoming call, the processor 702 connects the ring generator to cause the ordinary phone to begin ringing. When the user picks up the handset to answer the call, the processor 702 reverses the switches 730 and 732 to connect the tip connection 730 and ring connection 732 of the jack to a voice circuit established with the cellular telephone 204 so that bi-directional communication may occur.

The voice circuit is established through isolation transformers 722, 724 for the tip connection 730 and ring connection 732 to transform between a balanced ring and tip connection to an unbalanced signal-to-ground connection. The voice circuit includes a converter 718 to convert the audio transmission portion of the duplexed two-wire POTS signal to the audio transmission portion of the four-wire cellular phone signal. The DTMF receiver 704 receives the audio transmission portion of the four-wire phone signal to translate the audio tones to data signals. The converter 718 also duplexes the audio reception portion of the four-wire cellular phone signal together with the audio transmission portion of the four-wire cellular phone signal to output duplexed POTS signals to the connected ordinary telephone. The output of the encoder 706 is included on the audio reception portion of the four-wire cellular phone signal and is duplexed into the POTS signal by the converter 718 for reception by the ordinary telephone through the tip connection 730 and ring connection 732.

The ordinary telephone receives the standard −48 volt power across the tip connection 730 and ring connection 732 that is output by a talk battery/DC-DC converter 716. The talk battery/DC-DC converter 716, as well as one or more of the additional circuit components, are powered by a power supply 708. The power supply receives power from an input connection 712 through a protection fuse 710. The input connection 712 may be of various types discussed above but an AC input is shown as an example. The power supply 708 produces a standard operating voltage such as 12 volts from the input voltage through known techniques such as rectification and transformation or conversion depending upon the form of the input voltage. The standard output voltage is distributed so that the ring generator 714 may convert it to 90 volt pulsed DC and the talk battery/DC-DC converter 716 may convert it to −48 volt DC. A loop current detector 734 is included within the tip to ring loop to detect current variation that occurs due to the POTS telephone being on-hook or off-hook, and the loop current detector 734 provides a signal indicative of on-hook or off-hook to the processor 702.

The embodiment of the converter circuitry shown in FIG. 7 also provides an additional manner of monitoring and/or ensuring that the fixed device remains in a fixed location. This is done by including a zero crossing detector 720 that receives input power from the input power source 712 that provides AC power to the power supply 708. The zero crossing detector 720 provides an output to the processor 702 that indicates whether the zero crossing detector 720 detects an AC input. If the input power to the fixed wireless device 102 is not AC, such as because it is being powered by a battery so that it can be used while mobile, then the signal from the zero crossing detector 720 to the processor 702 allows the processor 702 to recognize that that operability of the fixed wireless device should be prevented. Once AC power is restored, then the processor 702 recognizes from the zero crossing detector 720 that operability can also be restored.

Figure 8:
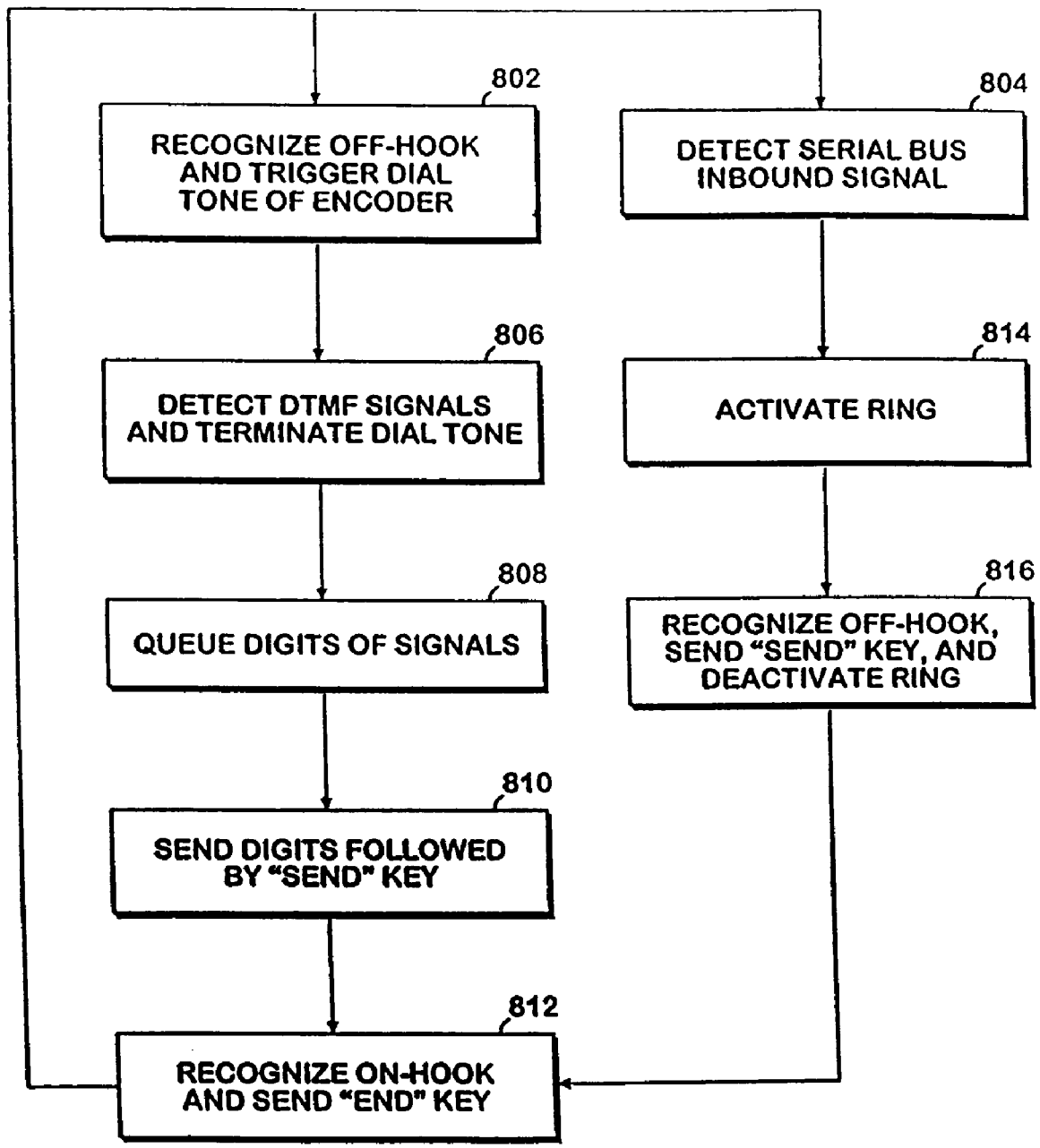
FIG. 8 shows an example of the operational flow of a processor of the converter circuitry of FIG. 7 to handle incoming and outgoing calls.

FIG. 8 summarizes the logical operations of the processor 702 to handle inbound and outbound telephone calls established through the fixed wireless device 102. The logical operations begin by the processor 702 recognizing an off-hook condition from the indicator of the detector 734 at outbound operation 802 or detecting that the cellular phone serial bus indicates that an inbound call is occurring at inbound operation 804.

When outbound operation 802 recognizes the off-hook condition, the processor 702 triggers the encoder 706 to produce the dial tone. Then, once the user begins to dial, the DTMF receiver 704 provides data signals to the processor 702 for the received analog tones to indicate that the user is dialing a number at signal operation 806. Also, at this point, the processor 702 terminates the production of the dial tone by the encoder 706. Operational flow then proceeds to store operation 808 where the processor 702 begins to queue the data signals that indicate the various numbers that the user is dialing. Upon receiving the pound key or other identifier key that indicates that the dialed number is complete, the processor 702 then sends the dialed digits that it has stored over the serial bus to the cellular phone followed by sending the send key at send operation 810 to simulate keypad dialing. The voice call is established through the voice circuit in response to the cellular phone completing the outbound call for the dialed digits. Upon the processor 702 recognizing that the ordinary telephone is on-hook from the indicator of the detector 734, the processor 702 sends the end key to the cellular phone over the serial bus at end operation 812 to terminate the call.

When inbound operation 804 detects that the cellular phone serial bus is indicating an inbound call, the processor 702 activates the ring relay that includes the switches 726, 728 to cause the ring generator 714 to begin ringing the ordinary telephone through the tip connection 730 and ring connection 732 at ring operation 814. Upon the processor 702 recognizing that the ordinary telephone is off-hook from the indicator of the detector 734, the processor 702 sends the send key command over the serial bus to the cellular phone at send operation 816 to cause the inbound call to be answered by the cellular phone. Also at this point, the processor 702 deactivates the ringer 714 by changing the relays 726, 728. The voice call is then established through the voice circuit. Upon the processor 702 recognizing that the ordinary telephone is on-hook from the indicator of the detector 734, the processor 702 sends the end key to the cellular phone over the serial bus at end operation 810 to terminate the call.

While the invention has been particularly shown and described with reference to various embodiments thereof, it will be understood by those skilled in the art that various other changes in the form and details may be made therein without departing from the spirit and scope of the invention.

What is claimed is:

1. A system for providing telephone service comprising:
a fixed wireless device for use in providing a communications link wherein the fixed wireless device includes a converter configured to;
  receive an indication as to whether a first signal has been received, and
  process a call if the first signal has not been received wherein the converter being configured to process the call comprises the converter performing one of the following: terminating the call in progress and preventing the call from being completed;
a plain old telephone service (POTS) device connected to the fixed wireless device; and
an antenna for providing telephone service by facilitating the communications link between the POTS device and a Public Switched Telephone Network (PSTN) via a wireless telephone network.

2. The system of claim 1, wherein the converter comprises a printed circuit board (PCB) for use in converting between wireless signaling and POTS signaling.

3. The system of claim 2, wherein the PCB includes a global positioning system receiver for determining whether the fixed device is located in a fixed location, and a comparator for comparing an initial location of the fixed device and a current location of the fixed device.

4. The system of claim 2, wherein the PCB includes a topology component for determining wireless telephone network parameters.

5. The system of claim 2, wherein the PCB includes a data capable wireless communication component to facilitate data transfer via the wireless telephone network.

6. The system of claim 1, wherein the fixed wireless device includes a wireless telephone for facilitating telephone service between the POTS device and the PSTN.

7. The system of claim 6, wherein a PCB adapts the wireless telephone for use with the POTS device.

8. The system of claim 1, wherein the fixed wireless device includes a wireless transceiver chipset for facilitating telephone service between the POTS device and the PSTN.

9. The system of claim 8, wherein a PCB adapts the wireless transceiver chipset for use with the POTS device.

10. The system of claim 1, wherein telephone service when using the fixed wireless device at a fixed location is charged at a first rate and telephone service when using the fixed wireless device at a location other than the fixed location is charged at a second rate.

11. The system of claim 1, wherein a computing device is connected to the fixed wireless device.

12. A system for providing telephone service comprising:
a fixed wireless device for use in providing a communications link, wherein the fixed wireless device is located in a vehicle;
a plain old telephone service (POTS) device connected to the fixed wireless device;
an antenna for providing telephone service by facilitating the communications link between the POTS device and a Public Switched Telephone Network (PSTN) via a wireless telephone network;
a memory, at the fixed wireless device, that stores a unique ID for an emitter, wherein a first signal received from the emitter has an encoded ID that identifies the emitter, and
a converter configured to provide wireless telephone service to a POTS connection only when the encoded ID from the first signal matches the unique ID stored in the memory.

13. The system of claim 12, wherein the converter comprises a printed circuit board (PCB) for use in converting between wireless signaling and POTS signaling.

14. The system of claim 13, wherein the PCB is used to verify that the fixed wireless device is located within the vehicle.

15. The system of claim 12, wherein the emitter is further configured for sending signals to verify the location of the fixed wireless device and an antenna to facilitate sending the signals by the emitter.

16. The system of claim 12, wherein the fixed wireless device includes a wireless telephone for facilitating telephone service between the POTS device and the PSTN.

17. The system of claim 12, wherein telephone service when using the fixed wireless device within the vehicle is charged at a first rate and telephone service when using the fixed wireless device at a location other than the vehicle is charged at a second rate.

* * * * *